(12) United States Patent
Tissieres

(10) Patent No.: US 11,759,922 B2
(45) Date of Patent: Sep. 19, 2023

(54) SCREW-DRIVING TOOL AND CORRESPONDING SCREW

(71) Applicant: IPP INDUSTRIES SARL, Bramois (CH)

(72) Inventor: Christian Tissieres, Bramois (CH)

(73) Assignee: IPP INDUSTRIES SARL, Bramois (CH)

( * ) Notice: Subject to any disclaimer, the term of this patent is extended or adjusted under 35 U.S.C. 154(b) by 923 days.

(21) Appl. No.: 15/741,929

(22) PCT Filed: Jul. 6, 2016

(86) PCT No.: PCT/EP2016/066053
§ 371 (c)(1),
(2) Date: Jan. 4, 2018

(87) PCT Pub. No.: WO2017/005825
PCT Pub. Date: Jan. 12, 2017

(65) Prior Publication Data
US 2018/0193986 A1      Jul. 12, 2018

(30) Foreign Application Priority Data
Jul. 7, 2015   (EP) .................................... 15175761

(51) Int. Cl.
*B25B 15/02*   (2006.01)
*F16B 23/00*   (2006.01)
*B25B 15/00*   (2006.01)

(52) U.S. Cl.
CPC .......... *B25B 15/005* (2013.01); *F16B 23/003* (2013.01); *F16B 23/0053* (2013.01)

(58) Field of Classification Search
CPC ... B25B 15/005; F16B 23/003; F16B 23/0053
(Continued)

(56) References Cited

U.S. PATENT DOCUMENTS

| 2,066,484 A | * | 1/1937 | Phillips | ................. | F16B 23/003 |
| | | | | | 411/404 |
| 2,445,525 A | * | 7/1948 | Gulden | ............... | F16B 23/0007 |
| | | | | | 411/404 |

(Continued)

FOREIGN PATENT DOCUMENTS

| EP | 0442629 | 8/1991 |
| EP | 0598561 | 5/1994 |

(Continued)

*Primary Examiner* — Orlando E Aviles
*Assistant Examiner* — J Stephen Taylor
(74) *Attorney, Agent, or Firm* — NIXON & VANDERHYE

(57) ABSTRACT

The invention relates to a screwing tool with a longitudinal axis X comprising a first, drive part, which can receive torque, and a second, transmission part, which is designed to cooperate with a screw, in order to re-transmit to it the torque received, the second part having a conical peripheral envelope with three longitudinal concavities with conical generatrices, defining three identical radial transmission lobes, each of which has, in a cross-section perpendicular to the longitudinal direction, a distal tangential portion which extends according to an arc of a circle, and is extended on both sides by two connection portions, each of which is defined by a curve comprising a substantially radial main part, and having a point of inflection before re-joining a proximal joining region which ensures the joining with an adjacent connection portion. The joining regions have a cone angle which is smaller than the cone angle of the tangential portions, and is substantially less than 5°, preferably less than 3°.

20 Claims, 4 Drawing Sheets

(58) Field of Classification Search
USPC ........... 81/460, 436; 411/403, 404, 436, 919
See application file for complete search history.

(56) References Cited

U.S. PATENT DOCUMENTS

| | | | |
|---|---|---|---|
| 5,378,101 A * | 1/1995 | Olson ................ | B25B 13/485 |
| | | | 411/404 |
| 5,957,645 A | 9/1999 | Stacy | |
| 7,147,421 B2 * | 12/2006 | Suzuki ................ | B25B 15/005 |
| | | | 411/404 |
| 7,293,949 B2 | 11/2007 | Dilling | |
| 8,182,187 B2 * | 5/2012 | Siong ................ | F16B 23/0007 |
| | | | 81/436 |
| 8,291,795 B2 | 10/2012 | Hughes et al. | |
| 2011/0217143 A1 | 9/2011 | Hughes et al. | |
| 2012/0099944 A1 * | 4/2012 | Kageyama .......... | F16B 23/0023 |
| | | | 411/403 |
| 2015/0000479 A1 * | 1/2015 | Lukes ................ | B25B 15/004 |
| | | | 81/436 |
| 2016/0121170 A1 | 5/2016 | Perner et al. | |
| 2016/0131170 A1 * | 5/2016 | Landsmann .......... | F16B 23/003 |
| | | | 81/460 |

FOREIGN PATENT DOCUMENTS

| | | | | |
|---|---|---|---|---|
| WO | 2008032137 | | 3/2008 | |
| WO | WO2008032137 | * | 3/2008 | ............. B25B 15/00 |
| WO | WO-2008032137 A1 | * | 3/2008 | ........... F16B 23/0038 |

* cited by examiner

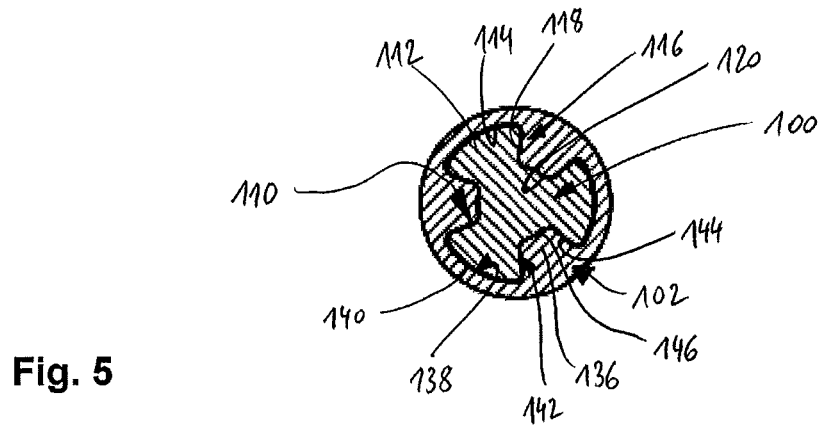
Fig. 5
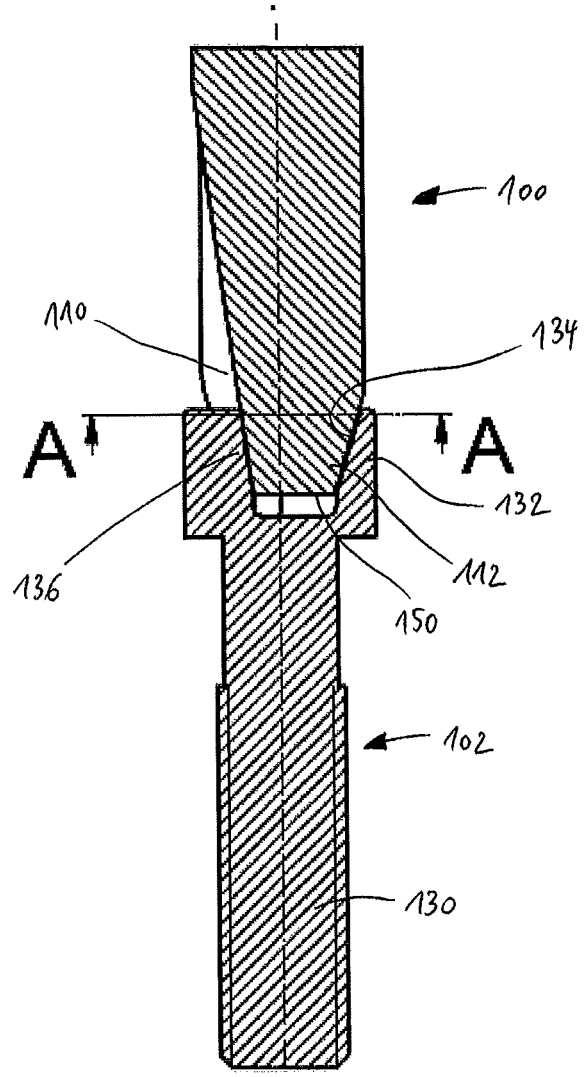

SCREW-DRIVING TOOL AND CORRESPONDING SCREW

CROSS-REFERENCE TO RELATED APPLICATIONS

This application is a § 371 national stage entry of International Application No. PCT/EP2016/066053, filed Jul. 6, 2016, which claims priority to European Patent Application No. 15175761.4, filed Jul. 7, 2015, the entire contents of which are incorporated herein by reference.

TECHNICAL FIELD

The present invention relates to a screwing tool with a longitudinal axis X comprising, according to its longitudinal direction, a first, drive part, which is designed to receive torque applied by a user or by a tool-holder, and a second, transmission part, which is secured in rotation to the first part, and is designed to cooperate with a screw, in order to re-transmit to it the torque received. According to the invention, the second part has a peripheral envelope with a generally conical form, the base of which is situated on the first part side, and has three longitudinal concavities with conical generatrices, regularly distributed, defining three identical radial transmission lobes, each of which has, in a cross-section perpendicular to the longitudinal direction, a distal tangential portion which extends substantially according to an arc of a circle, and is extended on both sides by two connection portions, each of which is defined by a curve comprising a substantially radial main part, and having a point of inflection before re-joining a proximal joining region which ensures the joining with an adjacent connection portion.

The present invention also relates to a screw with a head which can cooperate with the screwing tool complying with the above characteristics, in order to ensure that the screw is put into place by means of this screwing tool.

PRIOR ART

Screwing tools of this type are already known in patent literature.

By way of example, U.S. Pat. No. 2,445,525 dating from 1945 describes a longitudinal screwing tool comprising a transmission part with a peripheral envelope with a generally conical form, and with three longitudinal recesses, the bottom of each of which is delimited by a plane which is inclined with reference to the axis of the tool, these recesses being regularly distributed in the periphery of the envelope. The recesses thus define three identical radial transmission lobes, each of which has, in a cross-section perpendicular to the longitudinal direction, a distal tangential portion which extends substantially according to an arc of a circle, and is extended on both sides by two radial connection portions which join the bottom of the corresponding recess. It is explained in particular in this document that it is preferable to provide flat surfaces rather than curved surfaces for reasons of simplicity of production. However, the production of flat surfaces gives rise to the presence of sharp edges which can be brittle, particularly when substantial torque must be transmitted to a screw. In addition, these sharp edges are detrimental to the guiding of the tool when it is engaged in a screw recess. Finally, the inclinations of the different surfaces of the tool which are designed to come into contact with the surfaces of the screw are too large in relation to the longitudinal axis of the screw, in order for a stick fit effect (adhesion between the tool and the screw by friction) to be able to be obtained.

U.S. Pat. No. 2,066,484 of 1935 describes a tool similar to the one which has just been described, with the difference that it does not have a sharp edge, all the surfaces being conical, with the same angle of inclination relative to the longitudinal axis. The cooperation between this tool and the corresponding screw also does not give rise to a stick fit effect.

It has been found that since this invention, tools of this type and the corresponding screws have not been able to take the lead on the screws and bolts market, since the present standards have been in place for many years (mainly Phillips and Torx, registered trademarks), with the latter implementing geometries which are totally different from that of the type which has just been presented.

More recently, in 2006, the international application published under the number WO 2008/032137 A1 was filed, which describes a tool and a screw with geometries similar to those disclosed in the two aforementioned American documents. This application also proposes finding a solution to the existing requirement as far as stick fit is concerned, by forming series of raised points on the median lines of the concave joining regions situated between the transmission lobes of the tool. Hitherto, no tool has appeared on the market based on the teaching of this document, despite a certain number of obvious technical advantages, in particular good self-guiding of the tool when it is inserted in the recess of the screw, as well as aptitude of the tool to cooperate with screws of different dimensions as a result of the conicity of its transmission part. It can be noted that the stick fit effect obtained with a tool of this type would probably be unconvincing.

Even more recently the company (of the same name) which exploits the inventions of the renowned Mr Phillips has filed a patent application published under number US 2011/0217143 A1 which describes a screwing tool designed to provide a truly efficient stick fit effect. Thus, this application teaches that an effect of this type can be obtained starting with known recesses, simply by creating inclined planes with an angle of between 1 and 3° relative to the longitudinal axis, in peripheral regions which are not involved in the transmission of the torque, on the tool and on the associated screw.

However, although this document has a large number of variant embodiments, these all implement recesses with straight flanks (i.e. the generatrices of which are parallel to the longitudinal direction). Thus, this type of document (issued by one of the greatest players in the screws and bolts market) illustrates the fact that, even after 80 years, conical geometries have not been able to win people over, probably because all the solutions presented hitherto did not provide sufficient comfort of use.

DISCLOSURE OF THE INVENTION

A main objective of the present invention is to propose a screwing tool and an associated screw which provide a solution to all of the problems which have just been described, i.e. which provide great comfort of use, including for the transmission of high levels of torque, and polyvalence of the tool in relation to different dimensions of screws, and which also has an efficient stick fit effect.

For this purpose, the present invention relates more particularly to a conical screwing tool of the aforementioned type, characterized in that, according to the longitudinal direction, the joining regions have a cone angle which is smaller than the cone angle of the tangential portions, and is substantially less than 5°, preferably less than 3°.

Thanks to these characteristics, the screwing tool combines all of the required advantages, whilst optimizing them. In fact, both the distal tangential portions and the joining regions constitute surfaces which do not contribute to the transmission of torque between the screwing tool and the screw. The fact of providing surfaces which give rise to friction at the joining regions makes it possible to maintain a larger cone angle at the distal tangential portions, with an angular opening larger than that of the joining regions, which makes it possible to improve the guiding of the tool when it is inserted in a screw head.

The applicant has proved to be very daring in obtaining a solution of this type, not only because the solutions which dominate the market at present are of the straight flank type, as previously stated, but also because it has taken the risk of increasing the complexity of the geometry of the tool, as well as that of the screw, by implementing two different angles of conicity so as to obtain the stick fit effect in addition to the self-guiding, whereas the provision of flat surfaces is generally preferred.

Advantageously, the cone angle of the joining regions can be substantially between 0.5 and 2.5°, and preferably between 1 and 2°.

In general, the angle which is situated between the main parts of the two connection portions of a single transmission lobe can be equal to, or greater than, the angle which is situated between the main parts of two adjacent connection portions belonging to adjacent transmission lobes.

Thanks to these characteristics, the tool is strong enough to permit transmission of high levels of torque.

In this case, the angle which is situated between the main parts of the two connection portions of a single transmission lobe can be substantially between 75 and 85°.

In addition, according to a first preferred variant embodiment, each of the joining regions can have substantially the form of an arc of a circle.

As an alternative, according to another variant embodiment, each of the joining regions can have two concavities separated by a central, slightly convex portion.

In general, it is advantageous for the peripheral envelope to be without a sharp edge.

Thanks to this characteristic, the tool is less liable to be damaged, in particular when the screws have significant dimensional variations, for example as a result of excessive production tolerances.

In addition, the ratio between the radius measured at the middle of one of the joining regions and the radius measured at the middle of one of the tangential portions can be substantially between 0.3 and 0.7. This therefore provides a good compromise between comfort of use, in particular the ease of insertion of the tool in a screw recess, and the resistance of the tool during transmission of high levels of torque.

According to a preferred embodiment, the peripheral envelope can be truncated at its free end, such as to define a substantially flat surface which is perpendicular to the longitudinal direction at the end of the second part.

According to a preferred embodiment, the present invention also relates to a screw which is designed to cooperate with a screwing tool according to the above-described characteristics, comprising a portion containing a screw pitch and a head comprising a recess which is designed to receive at least partially the second part of the screwing tool.

BRIEF DESCRIPTION OF THE DRAWINGS

Other characteristics and advantages of the present invention will become more apparent from reading the following detailed description of preferred embodiments, provided with reference to the appended drawings provided by way of non-limiting example, and in which:

FIG. 2b represents a simplified view in longitudinal cross-section of the tool in FIG. 1, according to the cross-sectional plane A-A in FIG. 2a;

FIG. 3b represents a simplified view in longitudinal cross-section of the screw in FIG. 1, according to the cross-sectional plane B-B in FIG. 3a;

FIG. 5 represents simplified views in transverse and longitudinal cross-section of the tool and the screw in FIG. 4.

EMBODIMENT(S) OF THE INVENTION

Figure 1:
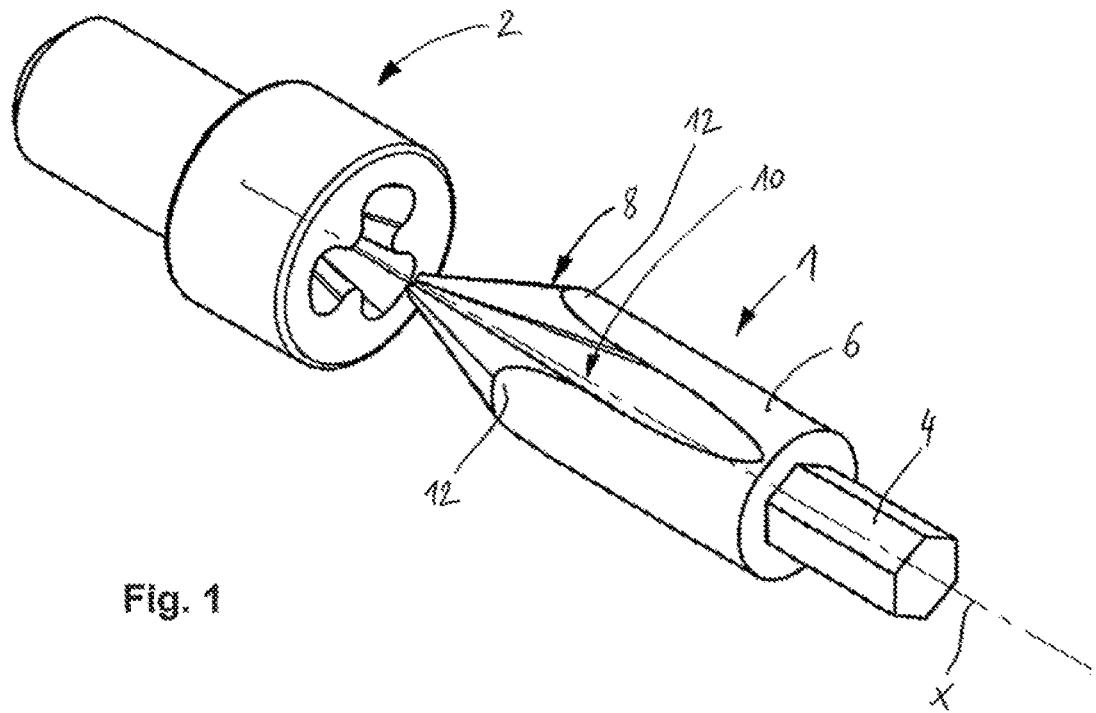
FIG. 1 represents a simplified view in perspective of an example of a tool and a corresponding screw according to a first preferred embodiment of the present invention.

FIG. 1 represents a simplified general view in perspective of an example of a screwing tool 1 and a corresponding screw 2 according to a first preferred embodiment of the present invention. The tool 1 is shown in greater detail in a front view (FIG. 2a with, on the right, an enlargement of the central part indicated as B in the view on the left), and in longitudinal cross-section (FIG. 2b), as is the screw 2 (respectively in FIGS. 3a and 3b).

The screwing tool 1 has a longitudinal axis X and comprises a first, drive part 4 which is designed to receive torque applied by a user or by a tool-holder. In this case, the first part 4 is illustrated with a transverse cross-section in the form of a hexagon, by way of non-limiting illustration, in order to be able to be coupled either with a handle of a screwdriver comprising a female socket with six facets, or with an appropriate tool-holder.

In its longitudinal direction, the tool 1 then comprises an intermediate central part 6, which is secured to the first part 4 and ensures the connection between the first part 4 and a second, transmission part 8, which is secured in rotation to the central part 6, and is designed to cooperate with the screw 2 in order to re-transmit to it the torque received.

Other embodiments of the general structure of the tool 1 can be envisaged without departing from the context of the present invention, such as, for example, the interposition of a universal connection between the first and second parts.

The second part 8 has a peripheral envelope with a generally conical form, the base of which is situated on the first part 4 side, in which three longitudinal concavities 10 with conical generatrices are provided whilst being regularly distributed, such as to define three identical radial transmission lobes 12.

It will be noted that in this case, the concavities 10 extend in the central intermediate part 6, without direct impact on the implementation of the invention, but rather for the sake of simplification of production of the screwing tool 1.

Figure 2A:
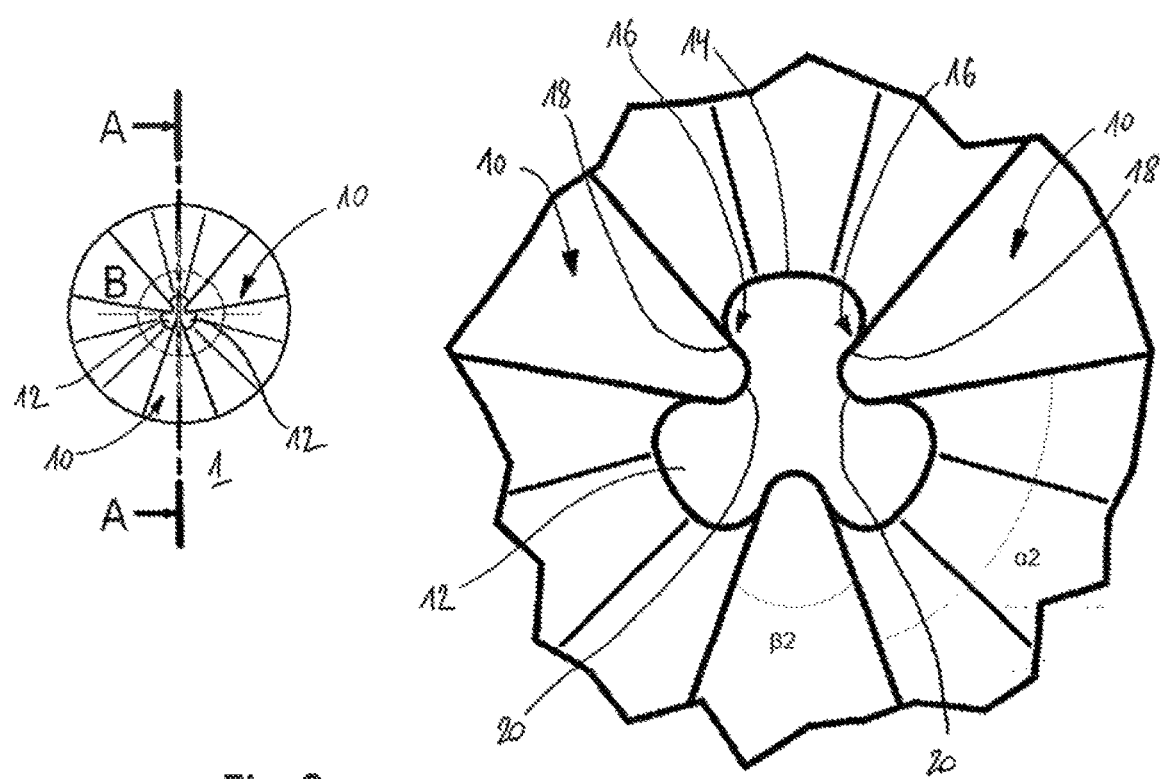
FIG. 2a represents a simplified front view of the tool in FIG. 1, on the left, and an enlargement of the central part, on the right.

As is more particularly apparent from FIG. 2a, in a cross-section perpendicular to the longitudinal direction, each of the transmission lobes 12 has a distal tangential portion 14 which extends substantially according to an arc of a circle, and is extended on both sides by two connection portions 16, each of which is defined by a curve comprising a substantially radial main part 18, and having a point of inflection, before joining once more a proximal joining region 20 which ensures the joining with an adjacent connection portion 16.

In this case, each of the joining regions 20 has substantially the form of an arc of a circle, preferably in a non-limiting manner.

Advantageously, the angle $\alpha2$ which is situated between the main parts 18 of the two connection portions 16 of a single transmission lobe 12 is equal to, or greater than, the angle $\beta2$ which is situated between the main parts 18 of two adjacent connection portions 16 belonging to adjacent transmission lobes 12. This angle $\alpha2$ can preferably be between 75 and 85°. In particular, the screwing tool 1 illustrated in FIG. 2a has such an angle of 80°, by way of non-limiting illustration.

The value of this angle affects directly the strength of the screwing tool 1, and therefore its capacity for transmitting greater or lesser torque. It will be appreciated that persons skilled in the art will be able to select a smaller angle in order to produce a tool which is designed to transmit torque with limited values, without departing from the context of the present invention.

In addition, the ratio between the radius measured at the middle of one of the joining regions 20 and the radius measured at the middle of one of the tangential portions 14 can advantageously be substantially between 0.3 and 0.7, in order to guarantee a good compromise between the comfort of use when the tool is inserted in the screw, and the strength of the tool.

Figure 2B:
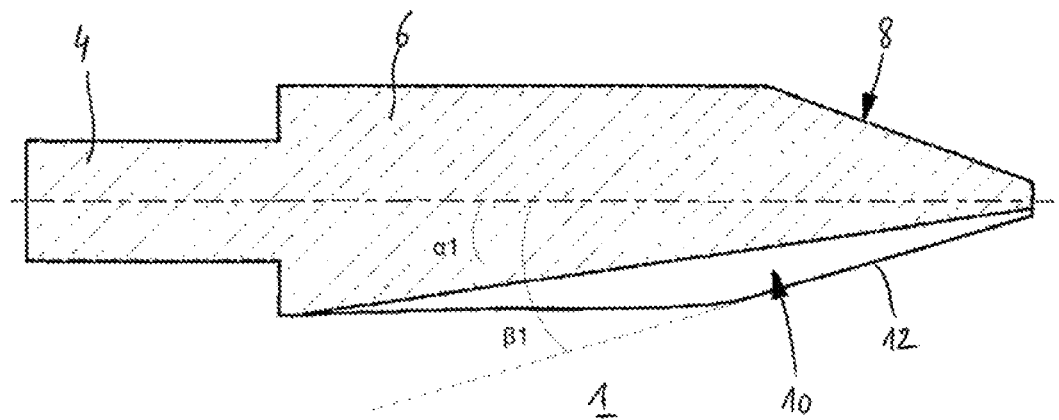

FIG. 2b represents a schematic view in longitudinal cross-section of the screwing tool 1, produced according to the plane indicated by A-A in the view on the left in FIG. 2a.

An angle $\beta1$ of approximately 20° is illustrated here for the conical envelope of the second part 8. The conical generatrices of the concavities 10 for their part have a cone angle $\alpha1$ (i.e. the angle between a generatrix and the longitudinal direction) which is reduced relative to the angle $\beta1$ of the conical envelope, which is in all cases 5° or less, preferably 3° or less, more preferably between 0.5 and 2.5°, and still more preferably between 1 and 2°. The reduced cone angle $\alpha1$ of the concavities 10 has been exaggerated in FIG. 2b for the sake of greater clarity.

An angle of this type makes it possible to ensure that the required stick fit effect is obtained, based on the general principle known as "Morse taper".

Figure 3A:
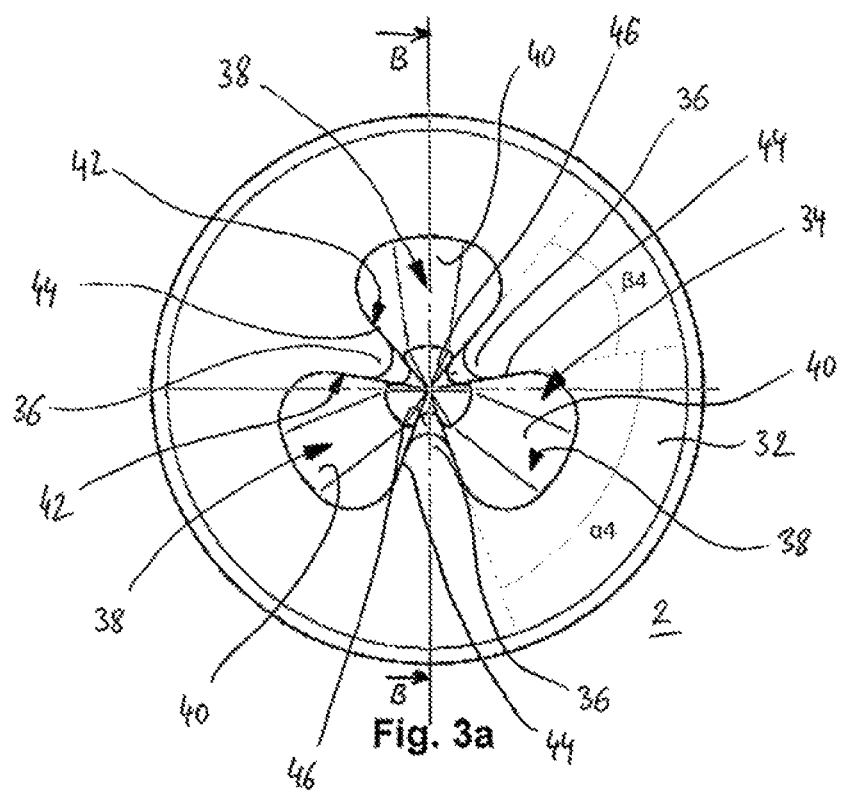
FIG. 3a represents a simplified front view of the screw in FIG. 1.
Figure 3B:
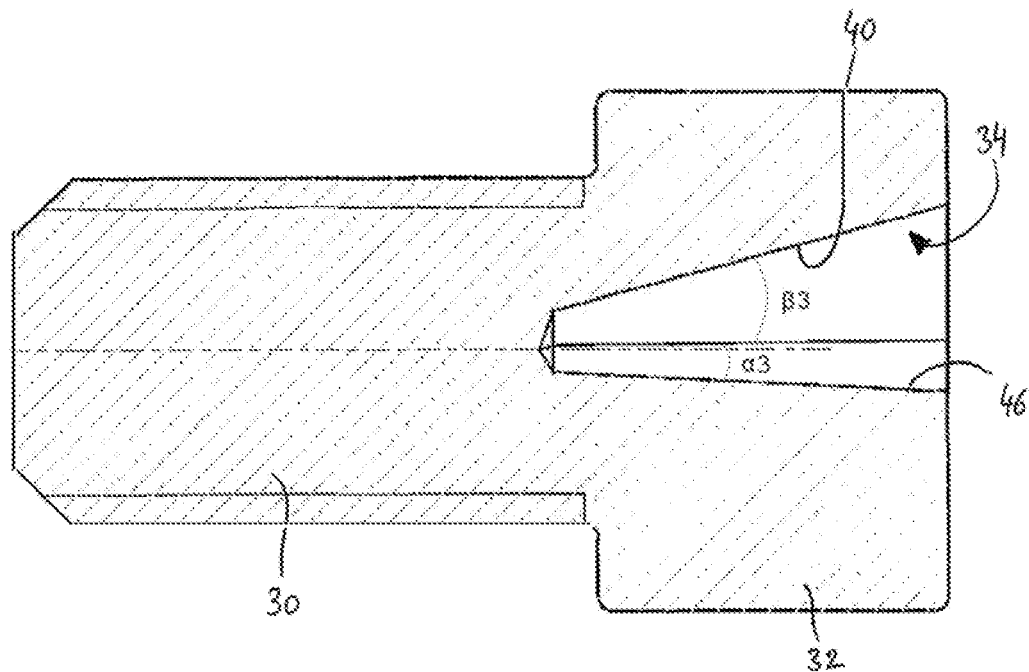

As shown in FIGS. 3a and 3b, the screw 2 has a geometry which is complementary to that of the screwing tool 1.

More specifically, the screw 2 comprises a functional portion 30 with a screw pitch and a head 32 comprising a recess 34 which is designed to receive at least partially the second part 8 of the screwing tool 1, the recess 34 having a peripheral envelope with a generally conical form, the base of which is situated on its opening side, and having three longitudinal excess thicknesses 36 with conical generatrices, regularly distributed, defining three identical radial transmission receptacles 38.

In a cross-section perpendicular to the longitudinal direction of the screw, each of the receptacles 38 has a distal tangential portion 40 which extends substantially according to an arc of a circle, and is extended on both sides by two connection portions 42, each of which is defined by a curve comprising a substantially radial main part 44, and having a point of inflection before re-joining a proximal joining region 46 which is situated on one of the excess thicknesses 36, and ensures the joining with an adjacent connection portion 42.

In addition, according to the longitudinal direction, the joining regions 46 have a smaller cone angle $\alpha3$ than the cone angle $\beta3$ of the tangential portions 40, and substantially smaller than 5°, preferably smaller than 3°.

The cone angle $\alpha3$ of the joining regions 46 is more preferably between 0.5 and 2.5°, and still more preferably between 1 and 2°. In addition, this angle $\alpha3$ is preferably slightly larger than that $\alpha1$ of the screwing tool 1, in order to ensure that the latter can be well inserted as far as the bottom of the recess 34.

As is the case for the tool 1, the angle $\alpha4$ which is situated between the main parts 44 of the two connection portions 42 of a single transmission receptacle 38 is equal to, or larger than, the angle $\beta4$ which is situated between the main parts 44 of two adjacent connection portions 42 belonging to adjacent transmission receptacles 38.

Advantageously, the ratio between the radius measured at the middle of one of the joining regions 46 and the radius measured at the middle of one of said tangential portions 40 can be substantially between 0.3 and 0.7.

Thanks to the above-described characteristics, a screwing tool 1 and the corresponding screw 2 are obtained which have considerable comfort of use, because of the large conical opening of the recess of the screw, which facilitates the insertion of the tool, and ensures self-guiding of the latter. The conical recess also makes it possible to use a single tool for several dimensions of screws, as already stated. The radial orientation of the connection portions ensures optimal transmission of the torque from the tool to the screw, whereas the relative dimensions respectively of the transmission lobes and the transmission receptacles ensure that high levels of torque can be transmitted without risk of damaging either the tool or the screw. Finally, the particular choice of the cone angle of the joining regions makes it possible to obtain a stick fit effect which is very convenient during use of the screwing tool. The joining regions scarcely intervene in the transmission of the torque, and thus the fact of providing a different cone angle does not affect the quality of transmission of the torque. Although the production of conical surfaces is more complex than the production of flat surfaces, it nevertheless makes it possible to increase substantially the surfaces which are in contact (for an identical angle between two connection parts situated opposite one another), and therefore to improve the quality of the stick fit effect thus obtained. In addition, as previously emphasized, implementation of these surfaces which give rise to the stick fit effect at the joining regions is advantageous since the latter have a reduced angular opening (in transverse cross-section). In fact, a measure of this type makes it possible to maintain a larger cone angle at the tangential portions, which have a large angular opening, which is more favorable from the point of view of comfort of use during insertion of the tool in the screw.

This therefore provides a geometry which constitutes an excellent compromise for complying simultaneously and satisfactorily with all the criteria which a screwing tool-screw assembly must fulfill.

Figure 4:
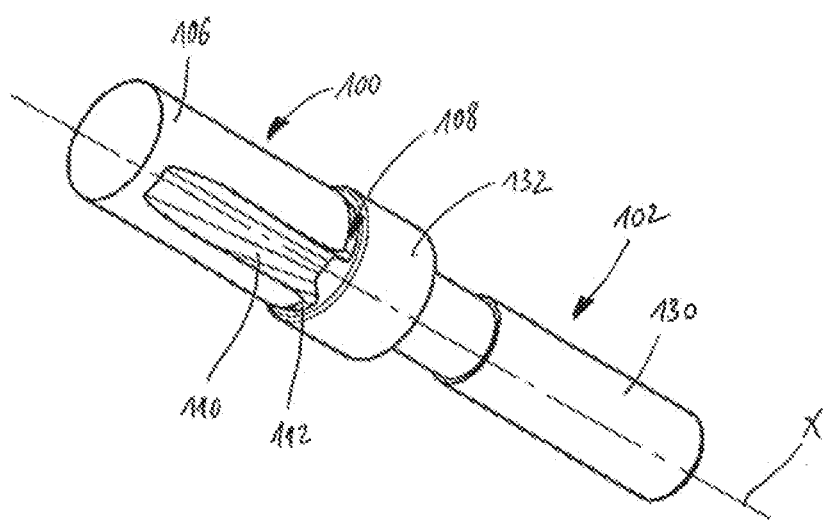
FIG. 4 represents a simplified view in perspective of an example of a tool according to a second preferred embodiment of the present invention, when it is engaged in the recess of a corresponding screw.

FIGS. 4 and 5 illustrate a screwing tool 100 and the corresponding screw 102 according to a second preferred embodiment of the present invention.

The tool 100 is shown in FIGS. 4 and 5, in which it is inserted in the screw 102.

The screwing tool 100 has a longitudinal axis X and comprises a first, drive part (not illustrated) which is designed to receive torque applied by a user or by a tool-holder.

According to its longitudinal direction, the tool 100 then comprises a central intermediate part 106 which is secured to the first part, and ensures the connection between the first part and a second, transmission part 108, which is secured in rotation to the central part 106, and is designed to cooperate with the screw 102 in order to retransmit to it the torque received.

The second part 108 has a peripheral envelope with a generally conical form, the base of which is situated on the first part side, in which three longitudinal concavities 110 with conical generatrices are provided whilst being regularly distributed, so as to define three identical radial transmission lobes 112.

It will be noted that the concavities 110 extend in the central intermediate part 106 without direct impact on the implementation of the invention, but rather for the sake of simplification of the production of the screwing tool 100.

As is more particularly apparent from the view situated at the top in FIG. 5, in a cross-section perpendicular to the longitudinal direction, each of the transmission lobes 112 has a distal tangential portion 114 which extends substantially according to an arc of a circle, and is extended on both sides by two connection portions 116, each of which is defined by a curve comprising a substantially radial main part 118, and having a point of inflection, before re-joining a proximal joining region 120 which ensures the joining with an adjacent connection portion 116.

In this case, each of the joining regions 120 has substantially the form of an arc of a circle with orientation which is inverse relative to the first embodiment, i.e. it is slightly convex. Each joining region can be seen to have two lateral concave portions which are separated from one another by a central convex portion.

Advantageously, the angle which is situated between the main parts 118 of the two connection portions 116 of a single transmission lobe 112 is equal to, or larger than, the angle which is situated between the main parts 118 of two adjacent connection portions 116 belonging to adjacent transmission lobes 112. This angle can preferably be between 75 and 85°.

In addition, the ratio between the radius measured at the middle of one of the joining regions 120 and the radius measured at the middle of one of the tangential portions 114 can advantageously be between 0.3 and 0.7, in order to guarantee a good compromise between the comfort of use when the tool is inserted in the screw, and the strength of the tool.

FIG. 5 represents a schematic view in longitudinal cross-section of the screwing tool 100.

The conical generatrices of the concavities 110 have an angle which is reduced with reference to the angle of the conical envelope, which in all cases is 5° or less, preferably 3° or less, more preferably between 0.5 and 2.5°, and still more preferably between 1 and 2°. The reduced cone angle of the concavities 110 has been exaggerated in FIG. 5 for the sake of greater clarity.

As is apparent from FIG. 5, the screw 102 has a geometry which is complementary to that of the screwing tool 100.

More specifically, the screw 102 comprises a functional portion 130 with a screw pitch and a head 132 comprising a recess 134 which is designed to receive at least partially the second part 108 of the screwing tool 100, the recess 134 having a peripheral envelope with a generally conical form, the base of which is situated on its opening side, and having three longitudinal excess thicknesses 136 with conical generatrices, regularly distributed, which define three identical radial transmission receptacles 138.

In a cross-section perpendicular to the longitudinal direction of the screw, each of the receptacles 138 has a distal tangential portion 140 which extends substantially according to an arc of a circle, and is extended on both sides by two connection portions 142, each of which is defined by a curve comprising a substantially radial main part 144, and having a point of inflection before re-joining a proximal joining region 146 which is situated on one of the excess thicknesses, and ensures the joining with an adjacent connection portion 142.

In addition, according to the longitudinal direction, the joining regions 146 have a cone angle which is smaller than the cone angle of the tangential portions 140, and is substantially less than 5°, preferably less than 3°.

The cone angle of the joining regions 146 is more preferably between 0.5 and 2.5°, and still more preferably between 1 and 2°. In addition, it is preferable for this angle to be slightly larger than that of the screwing tool 100, in order to ensure that the latter can be well inserted as far as the bottom of the recess 134.

In the same manner as for the tool 100, the angle which is situated between the main parts 144 of the two connection portions 142 of a single transmission receptacle 138 is equal to, or larger than, the angle which is situated between the main parts 144 of two adjacent connection portions 142 belonging to adjacent transmission receptacles 138.

Advantageously, the ratio between the radius measured at the middle of one of the joining regions 146 and the radius measured at the middle of one of said tangential portions 140 can be between 0.3 and 0.7.

Thus, implementation of this second embodiment provides the same advantages as those which have previously been described in relation with the first embodiment.

It will be noted that, although the tool 1 of the first embodiment ends almost in a point, the tool 100 of the second embodiment is slightly different, since the peripheral envelope of its second part 108 is truncated at its free end, such as to define a flat surface 150, substantially perpendicular to the longitudinal direction of the tool.

It will be noted that, in the two variants presented, the peripheral envelopes of the tool or of the recess of the screw are free from a sharp edge. Thus, not only is the insertion of the tool in the screw facilitated, but also the tool and the screw have a reduced risk of undergoing damage in the event of transmission of high levels of torque, in comparison with tools and screws with sharp edges.

The foregoing description is intended to describe two particular embodiments by way of non-limiting illustration, and the invention is not limited to the implementation of certain particular characteristics of it which have just been described, and in particular the forms illustrated and described for the parts do not have a direct link with the implementation of the invention, such as, for example, the form of the head of the screws or the joins between the tangential portions and the connection parts.

Depending on the materials used, on the one side for the screwing tool and, on the other side, for the screw, and depending also on the cone angle of their respective joining regions (up to 5°), a predefined force of the stick fit effect can be defined. Thus, one can provide a range of screwing tools (and/or screws) distributed along a scale (light, medium, strong, for instance) in terms of the stick fit effect force. Indeed, different forces might be expected for different screwing applications.

Persons skilled in the art will not find any particular difficulty in adapting the content of the present disclosure to their own needs, and in implementing a screwing tool and the corresponding screw according to the invention without necessarily implementing all the characteristics of the embodiment which has just been described.

The invention claimed is:

1. A screwing tool with a longitudinal axis comprising, according to said longitudinal axis:
   a first part, which is configured to receive torque applied by a user or by a tool-holder; and
   a second part, which is secured in rotation to said first part on a first part side, the second part being configured to cooperate with a screw, in order to re-transmit the received torque to the screw, said second part having a peripheral envelope with a generally conical form and a base, the base being situated on said first part side, the second part having three longitudinal concavities with regularly distributed conical generatrices, defining three identical radial transmission lobes, each of the three identical radial transmission lobes being defined by, in a cross-section perpendicular to said longitudinal axis,
   two connection portions each being defined by a curve comprising a substantially radial main part, and
   a distal tangential portion which extends substantially according to an arc of a circle, the distal tangential portion being extended on both sides by the two connection portions, each of the connection portions having a point of inflection before re-joining a respective proximal joining region which ensures the joining with an adjacent connection portion of an adjacent radial transmission lobe, the respective proximal joining regions being disposed between the adjacent connection portions of the respective adjacent radial transmission lobes and being the most interior portion of the respective radial transmission lobe in relation to the longitudinal axis, said proximal joining regions having a first cone angle defined in relation to the longitudinal axis which is smaller than a second cone angle of said distal tangential portions defined in relation to the longitudinal axis, the first cone angle being between 1° and 3°, said proximal joining regions being configured to be brought into direct contact with corresponding proximal joining regions of a corresponding screw into which said screwing tool is inserted substantially all along the depth of insertion.

2. The screwing tool as claimed in claim 1, wherein said first cone angle of said proximal joining regions is between 1° and 2.5°.

3. The screwing tool as claimed in claim 1, wherein a third angle which is situated between said substantially radial main parts of said two connection portions of a single transmission lobe of said three identical radial transmission lobes is equal to, or greater than, a fourth angle which is situated between said substantially radial main parts of two adjacent connection portions belonging to adjacent transmission lobes.

4. The screwing tool as claimed in claim 3, wherein the third angle which is situated between said substantially radial main parts of said two connection portions of the single transmission lobe is substantially between 75 and 85°.

5. The screwing tool as claimed in claim 1, wherein each of said proximal joining regions has substantially the form of an arc of a circle.

6. The screwing tool as claimed in claim 1, wherein each of said proximal joining regions has two concavities separated by a central, convex portion.

7. The screwing tool as claimed in claim 1, wherein said peripheral envelope is without a sharp edge.

8. The screwing tool as claimed in claim 1, wherein said peripheral envelope is truncated at its free end to define a substantially flat surface which is perpendicular to said longitudinal axis at the end of said second part.

9. The screwing tool as claimed in claim 1, wherein a ratio between a radius measured at the middle of one of said joining regions and the radius measured at the middle of one of said distal tangential portions is substantially between 0.3 and 0.7.

10. A screw comprising:
    a portion containing a screw pitch; and
    a head comprising a recess which is configured to cooperate with a screwing tool, said recess having a peripheral envelope with a generally conical form and a base, the base being situated on an opening side thereof, and having three longitudinal excess thicknesses with regularly distributed conical generatrices, defining three identical radial transmission receptacles, each of the three identical radial transmission receptacles being defined by, in a cross-section perpendicular to a longitudinal direction,
    two connection portions each being defined by a curve comprising a substantially radial main part, and
    a distal tangential portion which extends substantially according to an arc of a circle, the distal tangential portion being extended on both sides by the two connection portions, each of the two connection portions having a point of inflection before re-joining a respective proximal joining region which is situated on one of said excess thicknesses, and ensures the joining with an adjacent connection portion of an adjacent radial transmission receptacle, the respective proximal joining regions being disposed between the adjacent connection portions of the respective adjacent radial transmission receptacles and being the most interior portion of the respective radial transmission receptacle in relation to the longitudinal axis, said proximal joining regions having a first cone angle defined in relation to the longitudinal axis which is smaller than a second cone angle of said tangential portions defined in relation to the longitudinal axis, the first cone angle being between 1° and 3°, said proximal joining regions being configured to be brought into direct contact with corresponding proximal joining regions of a corresponding screwing tool configured to be inserted into said recess substantially all along the depth of insertion of said screwing tool.

11. The screw as claimed in claim 10, wherein said first cone angle of said proximal joining regions is between 1° and 2.5°.

12. The screw of claim 11, wherein a third angle which is situated between said substantially radial main parts of said two connection portions of a specific transmission receptacle of said three identical radial transmission receptacles is equal to, or greater than, an angle which is situated between said substantially radial main parts of two adjacent connection portions belonging to adjacent transmission receptacles.

13. The screw of claim 12, wherein the third angle which is situated between said substantially radial main parts of said two connection portions of a specific transmission receptacle of said three identical radial transmission receptacles is substantially between 75 and 85°.

14. The screw of claim 11, wherein said peripheral envelope is without a sharp edge.

15. The screw of claim 11, wherein a ratio between a radius measured at the middle of one of said proximal joining regions and a radius measured at the middle of one of said distal tangential portions is substantially between 0.3 and 0.7.

16. The screw as claimed in claim 10, wherein a third angle which is situated between said substantially radial main parts of said two connection portions of a single transmission receptacle of said three identical radial transmission receptacles is equal to, or greater than, a fourth angle which is situated between said substantially radial main parts of two adjacent connection portions belonging to adjacent transmission receptacles.

17. The screw as claimed in claim 16, wherein the third angle which is situated between said substantially radial main parts of said two connection portions of the single transmission receptacle is substantially between 75 and 85°.

18. The screw of claim 16, wherein said peripheral envelope is without a sharp edge.

19. The screw as claimed in claim 10, wherein said peripheral envelope is without a sharp edge.

20. The screw as claimed in claim 10, wherein a ratio between a radius measured at the middle of one of said proximal joining regions and a radius measured at the middle of one of said distal tangential portions is substantially between 0.3 and 0.7.

\* \* \* \* \*